United States Patent

[11] 3,587,066

[72] Inventors Daniel Gibacier;
Tran Van Khai, both of Paris, France
[21] Appl. No. 716,091
[22] Filed Mar. 26, 1968
[45] Patented June 22, 1971
[73] Assignee CSF Compagnie Generale De Telegraphie Sans Fil
[32] Priority Apr. 4, 1967
[33] France
[31] 101,466

[54] MAGNETIC MEMORY
4 Claims, 14 Drawing Figs.

[52] U.S. Cl. .......... 340/174
[51] Int. Cl. .......... G11c 5/02, G11c 7/00
[50] Field of Search .......... 340/174 M, 174

[56] References Cited
UNITED STATES PATENTS

| | | | |
|---|---|---|---|
| 3,440,622 | 4/1969 | Smith | 340/174 |
| 3,274,571 | 9/1966 | Bobeck | 340/174 |
| 3,222,656 | 12/1965 | Olsson | 340/174 |
| 3,278,910 | 10/1966 | Bobeck | 340/174 |
| 3,312,960 | 4/1967 | Bobeck | 340/174 |

*Primary Examiner*—James W. Moffitt
*Attorney*—Cushman, Darby and Cushman

ABSTRACT: A memory arrangement of the matrix type having associated readout and write-in circuits, the readout circuits being designed to provide readout pulses having the same polarity as to write-in pulses so as not to destroy the information contained in each memory element.

MAGNETIC MEMORY

The present invention relates to waffle iron memory systems.

Such memories are well known in the art. They comprise a substrate carrying grooves in row and column arrangement to form a matrix. The substrate is generally made of a magnetically soft material. Wires are deposited in the grooves and a layer of magnetic material with a rectangular hysteresis loop covers the assembly thus produced.

In such memories, the information items 1 or 0 are written in at an intersection point, or more frequently at the four intersection points defining a square area, by the simultaneous passage of current pulses through the wires which cross at these intersections. The pulses produce a certain magnetic configuration. Other pulses are fed through a readout wire, to produce, in an output circuit, signals whose form is a function of the information which has been written in the memory system.

Generally speaking, the readout process results in the erasing of the information recorded. This may be inconvenient in certain cases.

It is an object of this invention to avoid this drawback.

According to the invention there is provided a waffle iron memory comprising: a first and a second plurality of parallel grooves forming a matrix; a first and a second plurality of wires extending respectively in said first and second pluralities of grooves, and having a plurality of crossing points; means for simultaneously feeding to one wire of said first plurality one pulse, having a predetermined level corresponding to a significant digit 1 or 0 and for feeding to one wire of said second plurality a word write-in pulse having a predetermined level; means for successively feeding to said one wire of said second plurality word readout pulses of the same polarity as said write-in pulses, said readout pulses having a level so adjusted as to switch the magnetic flux in the immediate vicinity of the crossing point of said wires and to cause a reversible flux direction rotation in the grooves of said first plurality; and means connected to said wires of said first plurality for collecting signal voltage in response to said flux switching.

For a better understanding of the invention and to show how the same may be carried into effect, reference will be made to the drawings accompanying the ensuing description and in which.

Figure 3A:
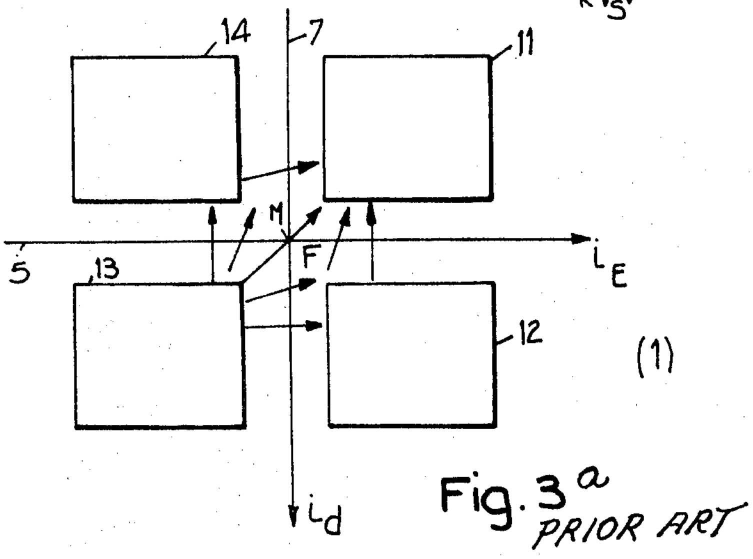
Fig. 3a PRIOR ART
Figure 3B:
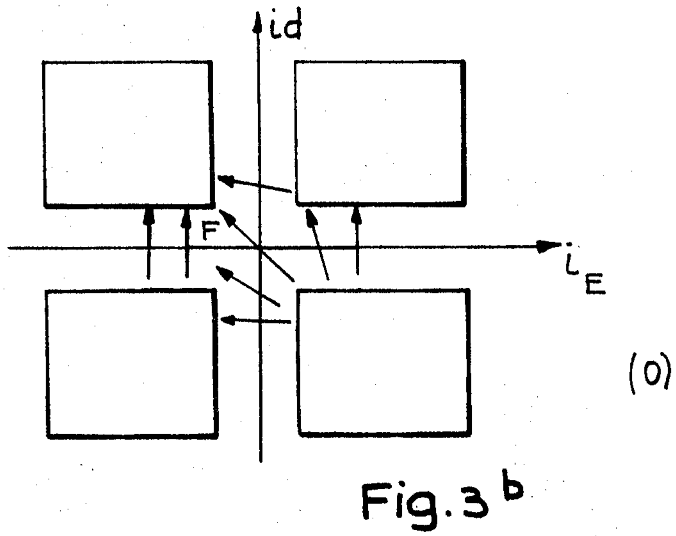
Figures 4, 6, 7, 8, 9:
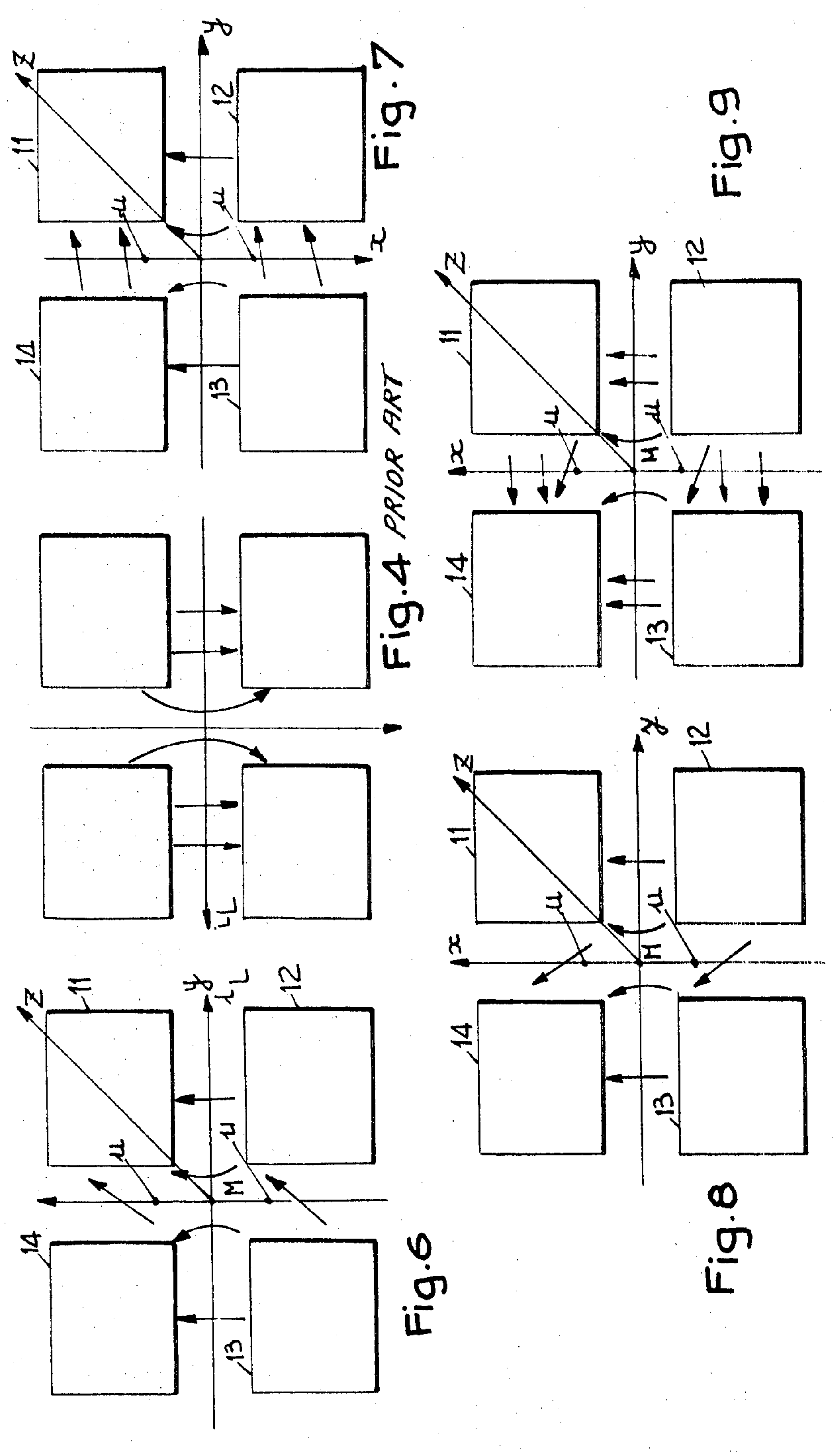
Fig. 4 PRIOR ART, Fig. 6, Fig. 7, Fig. 8, Fig. 9
Figure 5:
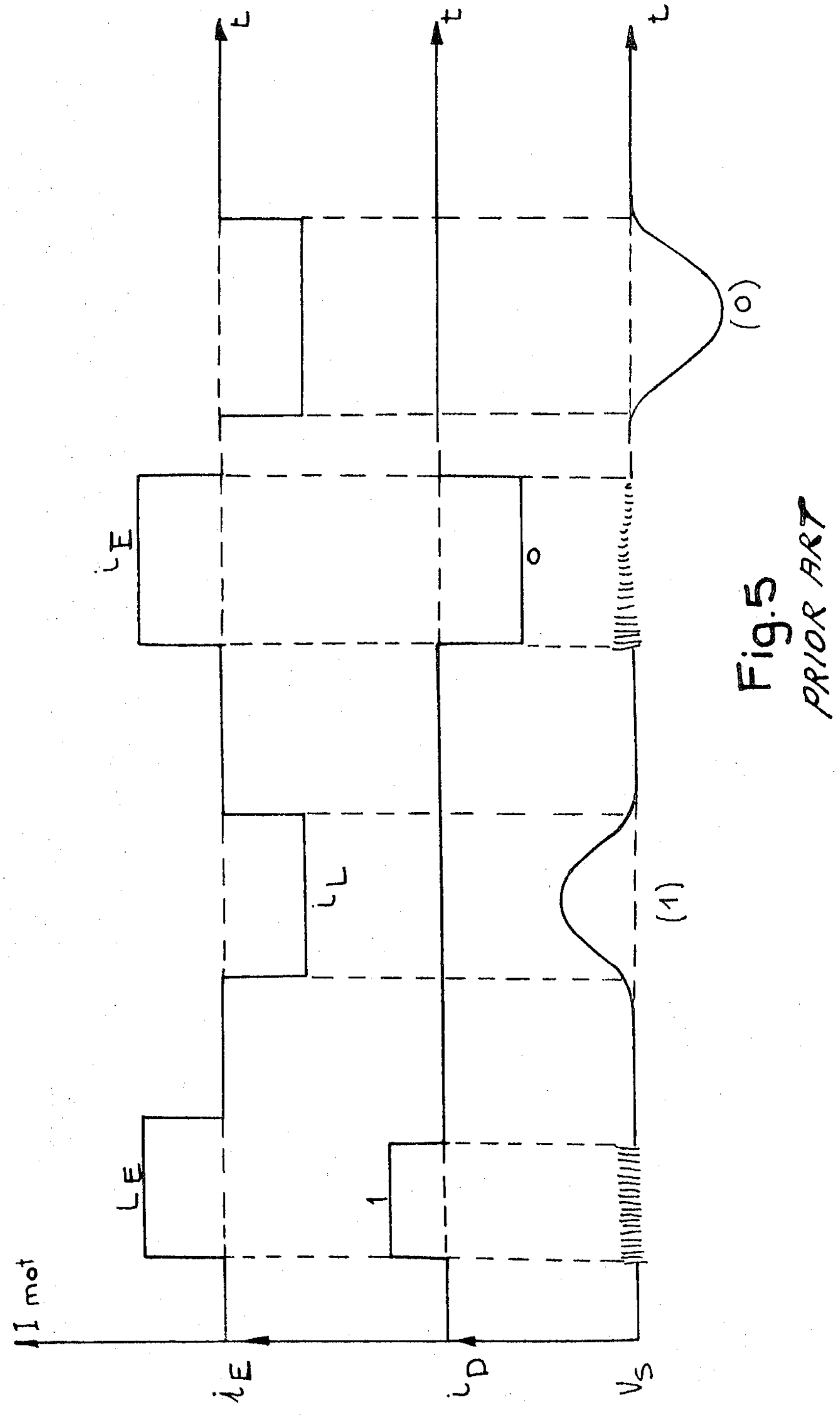
Fig.5 PRIOR ART
Figure 10:
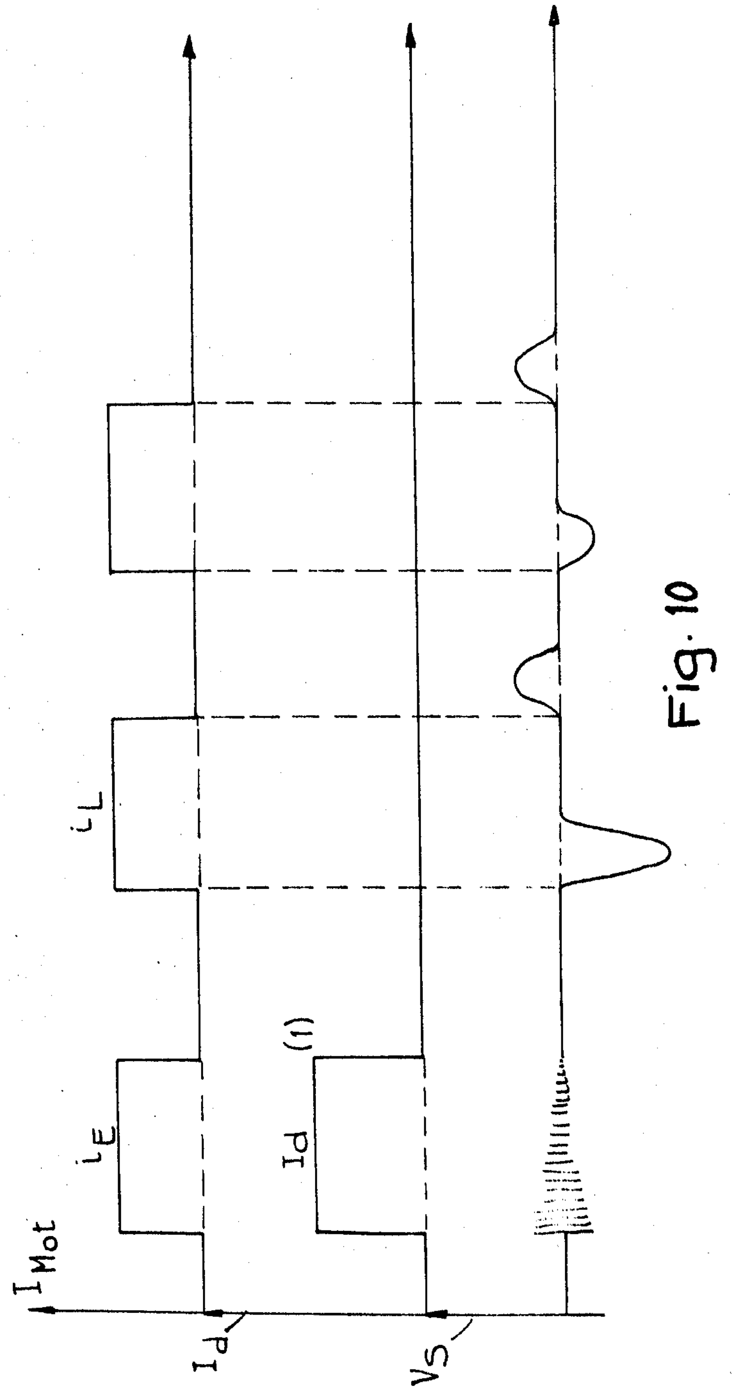
Figure 11:
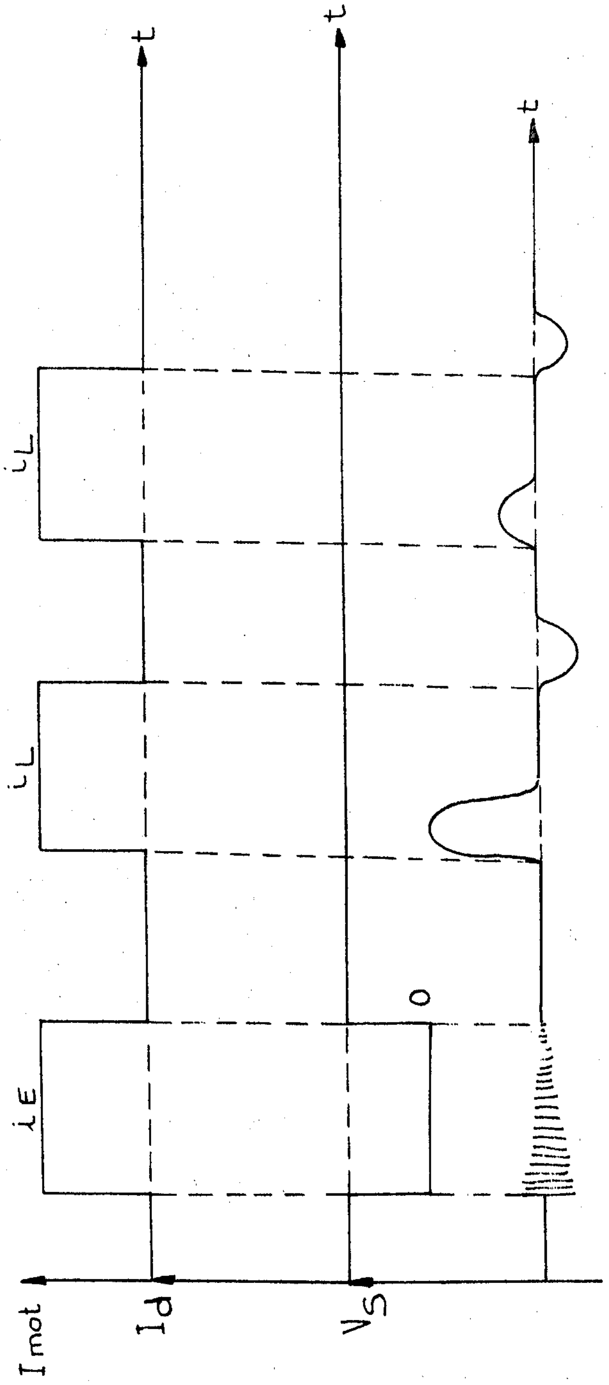
Figure 12:
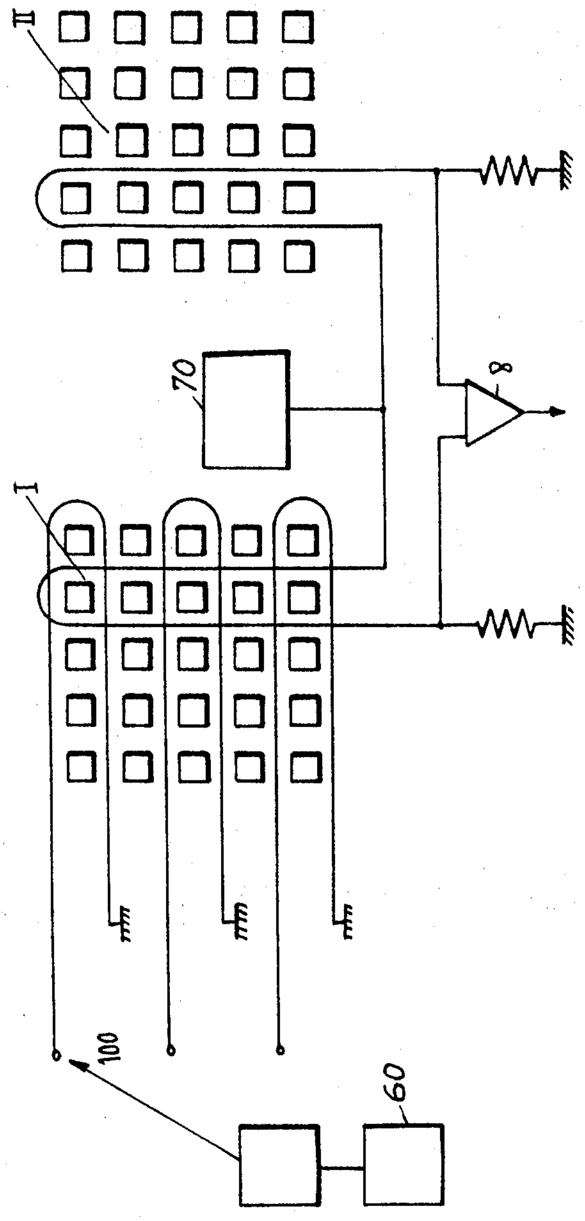

FIGS. 3*a*, 3*b* and 4 illustrate magnetic configuration of the kind obtained in known systems;

FIG. 5 illustrates the kinds of signals applied to the various wires in the known systems;

FIGS. 6 to 9 illustrate the magnetizations produced in a memory element in accordance with the invention;

FIGS. 10 and 11 are explanatory graphs;

FIG. 12 is an exemplary embodiment; and

Figure 13:
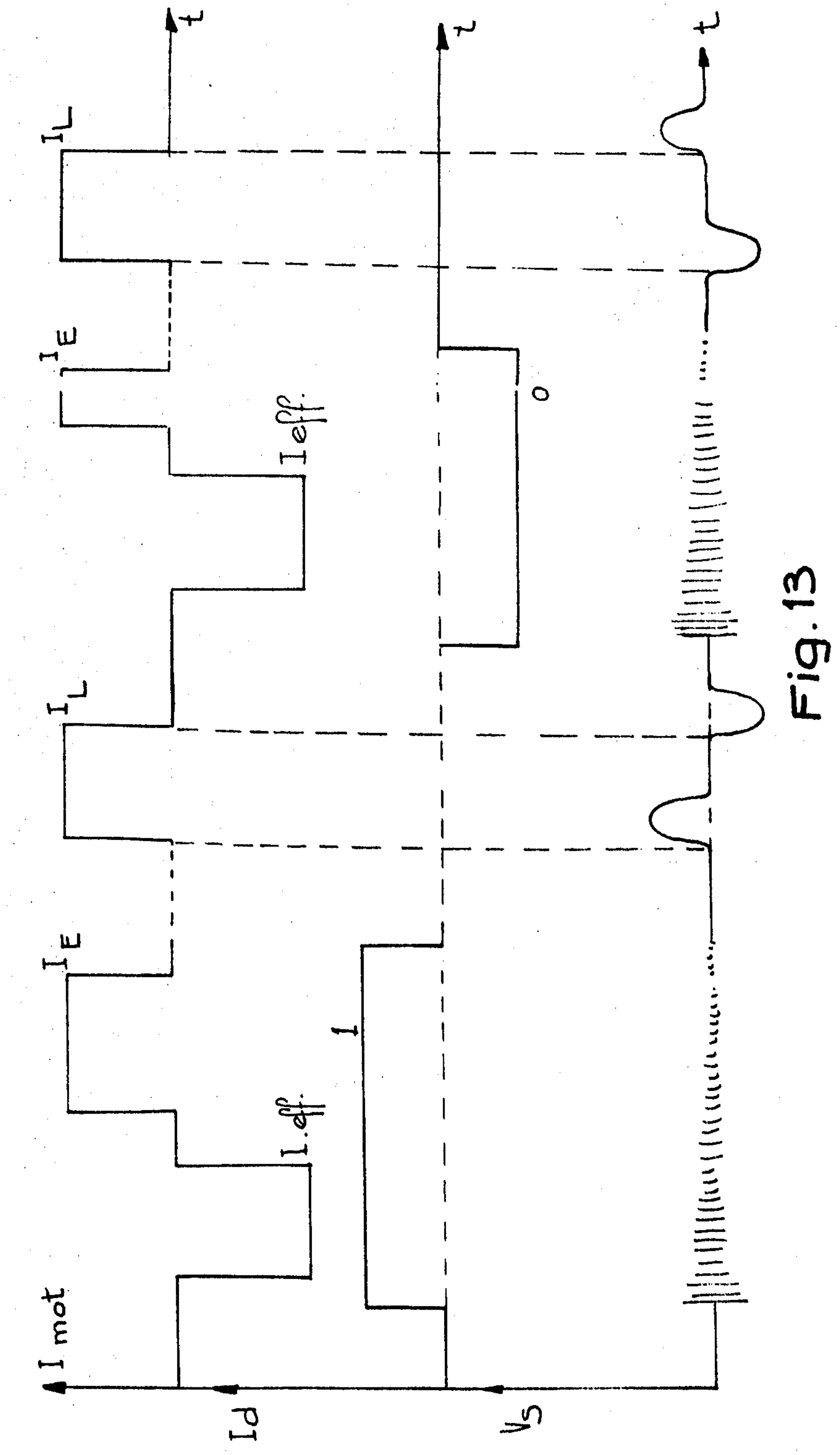

FIG. 13 is a set of explanatory graphs.

Figure 1:
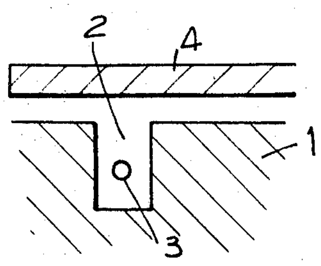
FIG. 1 illustrates in section an example of a magnetic memory element of the matrix type.

In FIG. 1, there can be seen in section a memory system of the above-mentioned type. It comprises a substrate or "keeper" 1, made of a magnetically soft material. This substrate contains grooves arranged in rows and columns, one column 2 being shown. In each of the grooves there is located a wire 3. The assembly is covered by a layer 4 of ferromagnetic material having a rectangular hysteresis loop. One memory of this sort and its associated circuits are diagrammatically illustrated in FIG. 2. It will be seen that the grooves 2 form an arrangement of squares. Two kinds of wires are disposed in the grooves, The word wires 3 are horizontal in the figure. Each word wire passes through two successive horizontal grooves. One of its ends is earthed and the other is connected to a signal generator 60, which will be dealt with in detail hereinafter and the signals from which serve both for readout and write-in.

The digit wires are arranged in the same way but in a vertical attitude. One of their ends in each case is earthed. The other end is connected on the one hand to a signal generator 70 and on the other to an amplifier 8 at the output of which the information is produced.

The information is stored at the four points M N P Q of intersection between the wires 5 and 7.

The operation will be understood from FIGS. 3, 4 and 5.

FIGS. 3*a*, 3*b* and 4 illustrate one intersection point, say M; the wires 5 and 7 pass between four squares 11 to 14 defined by the grooves. Let it be assumed that the generator 60 delivers a first train of "word" signals $i_E$, which are indicated in the first line of FIG. 5. The generator 70 produces a train of digit pulses $i_D$ as also illustrated in FIG. 5.

The word pulses $i_E$ are positive and the readout pulses $i_L$ are negative. As to digit pulses $i_D$, they are positive to designate digit 1 and negative to designate digit 0.

Pulses $i_E$ and pulses $i_D$ result in the magnetization of the memory. The lines of force of this magnetization are illustrated in FIG. 3. This magnetization results at M in a flux F which in inclined with respect both to wires 5 and wires 7. Along each groove, as the distance away from the point M increases, the magnetization tends to become perpendicular to the wire. The digit 1 is represented by a current of the kind indicated in FIG. 3*a* and the digit 0 by a current $i_D$ of opposite sign as indicated in FIG. 3*b*.

The negative or readout currents $I_L$ erase throughout the zone surrounding the point M, the preceding magnetization and give rise to the configuration shown in FIG. 4. The change in state of this magnetization produces an induced pulse $V_S$ which goes to the amplifier. This pulse has a positive peak for the digit 1, and a negative peak for the digit 0. The amplifier thus produces an output signal which is a function of the stored information.

However, this readout is destructive of the recorded information, since the magnetization throughout the zone surrounding the point in question has changed state.

The following figures illustrate circuits which, in accordance with the invention, enable information readout to be effected without destroying the stored information.

FIGS. 6, 7, 8 and 9 illustrate various magnetic states which are produced by the trains of signals in accordance with the present invention.

The information 1 is written-in, as shown in FIG. 10, by simultaneous positive currents $i_E$ and positive or negative currents $i_D$ (1 or 0). This results in the magnetization state as shown in FIG. 3 and 3*b* and which will hereinafter refer to as state (3).

Figure 2:
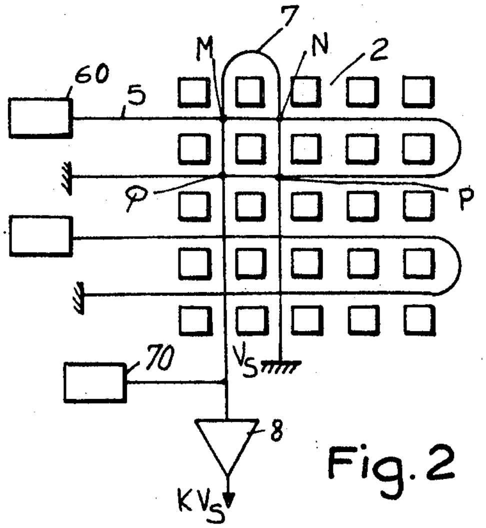
FIG. 2 illustrates a memory and its associated circuits.

The signal generator 60 of FIG. 2 then produces a train of positive readout pulses $i_L$; with each pulse, the flux pattern takes the form shown in FIG. 6. The readout current is sufficiently high to cause the flux to be switched from direction it has in FIG. 3*a*, in the immediate vicinity of the point M, while in the zones marked *u*, the flux undergoes a reversible rotation, the flux tending to become perpendicular to the word wire. However, when the pulse $i_L$ no longer exists in this latter zone, the flux returns to the magnetization direction it has before the application of the pulse $i_L$. The situation is then that shown in FIG. 7. The reapplication of the pulse $i_L$ brings the magnetization back to the state shown in FIG. 6. Thus, the sequence 7-6-7, etc., etc., is produced.

FIG. 10 represents thus various signal sequences for this particular case. At each edge of the rectangular current pulses $i_L$, a pulse is produced, which is positive, if the change is from 0 to 1, and negative in the opposite case.

It will be noted that the first readout signal is somewhat larger in magnitude than the following ones. This is due to the passage from the state 3*a*, shown in FIG. 3 to the condition shown in FIG. 6, i.e. is due both to the switching of the flux in the immediate vicinity of the point M and to the reversible flux direction rotation taking place in the regions *u*. Only this latter effect exists during subsequent readout periods.

In order for the above procedure to take place, it is necessary, $\vec{H_L}$ being the field associated with the readout current and $\vec{H_D}$ the field associated with the digit current, to have the relationship $H_L+H_D>H_Z$, where $H_Z$ is the switching threshold value in the direction Mz, (i.e. the bissectrix of right angle between the grooves), $H_L<H_x$, and $H_x$ is the switching threshold value along direction M*x*.

The readout is thus produced by reversible rotation in the regions marked *u*. Between each readout operation, the memory retains the recorded digit 1.

A similar phenomenon occurs when the digit 0 has been written-in, as shown in FIGS. 8 and 9. FIG. 11 illustrates the train of pulses corresponding to the digit O. The readout pulses are inverted.

FIG. 13 shows a train of pulses, in which the write-in current is preceded by an erase current $I_{off}$ which is also applied to the word wire. Preferably, the digit pulses will be applied at the same time as the erase and write-in currents.

Whilst the write-in current is flowing, the magnetic state is that indicated in FIG. 4. After the writing-in, the magnetic state is as indicated in FIGS. 3*a* or 3*b*, all in accordance with whether the digit current represented is 1 or a 0.

The ensuing readout (current $I_L$), then produce the states of FIGS. 6 or 8 and the magnetization reverts to the states shown in FIGS. 7 or 9 between the readout current phases.

In this procedure, the operation of nondestructive readout is the same as described before. Erasing prior to writing-in has the effect that the states of FIGS. 3*a* and 3*b* are better differentiated from one another and that the output signal is substantially stronger than in the process described in relation to FIGS. 10 and 11.

By way of example, for an isotropic magnetic film having the following characteristics:

thickness : 1 micron
coercive force : 10 oersteds one has:

$i_L=i_e$=ma.±50ma.
$i_D$=ma.±20ma.
$V_s$=2to 3mv.

FIGS. 12 and 13 illustrate by way of example a circuit which produces the set of signals in accordance with the present invention.

The circuit of FIG. 12 comprise two memories I and II.

The generator 60 is connected to the word wires in memories I and II, by a switch 100. Only the connections to memory I are shown. Each digit line of the memory I is associated with a digit line of memory II. They are connected to the same amplifier 8. The purpose of this kind of circuit arrangement is to reduce parasitic effects during write-in.

The generator 60 and the digit current generator produce signals shown in FIGS. 10 and 11 or in FIG. 13.

Of course the invention is not limited to the embodiment described and shown which was given solely by way of example.

I claim:

1. A waffle iron memory comprising a layer of ferromagnetic material having a rectangular hysteresis loop and a keeper of a magnetically soft material extending parallelly to said layer; said keeper comprising: a first and second plurality of parallel grooves forming a matrix; a first and a second plurality of wires extending respectively in said first and second plurality of wires extending respectively in said first and second pluralities of grooves and having a plurality of crossing points; means for simultaneously feeding to one wire of said first plurality one pulse, having a predetermined level corresponding to a significant digit 1 or 0 and for feeding to one wire of said second plurality a word write-in pulse having a predetermined level; means for successively feeding to said one wire of said second plurality word readout pulses of the same polarity as said write-in pulses, said readout pulses having a level so adjusted as to switch the magnetic flux in the immediate vicinity of the crossing point of said wires and to cause a reversible flux direction rotation in the grooves of said first plurality; and means connected to said wires of said first plurality for collecting signal voltage in response to said flux switching.

2. A memory as claimed in claim 1, wherein said signal voltage collecting means are selectively connected to said wires of said first plurality.

3. A memory as claimed in claim 1, in which each wire is loop shaped and extends into two adjacent grooves.

4. A memory as claimed in claim 1, wherein said means for feeding said wires of said second plurality further generate in synchronism with said digit pulses, erasing pulses of polarity opposite to that of said write-in pulses, preceding said write-in pulses, the sum of the duration of said write-in pulses and said erasing pulses being equal to that of said digit pulses.